(12) United States Patent
Panjwani

(10) Patent No.: US 7,343,599 B2
(45) Date of Patent: Mar. 11, 2008

(54) NETWORK-BASED PATCHING MACHINE

(75) Inventor: Dileep Kumar Panjwani, San Jose, CA (US)

(73) Assignee: Blue Lane Technologies Inc., Santa Clara, CA (US)

( * ) Notice: Subject to any disclaimer, the term of this patent is extended or adjusted under 35 U.S.C. 154(b) by 560 days.

(21) Appl. No.: 11/029,098

(22) Filed: Jan. 3, 2005

(65) Prior Publication Data

US 2006/0156032 A1   Jul. 13, 2006

(51) Int. Cl.
G06F 9/44 (2006.01)
(52) U.S. Cl. .................... 717/168; 726/13; 726/22
(58) Field of Classification Search ........ 717/168–171; 726/12, 13, 23, 24, 11, 22
See application file for complete search history.

(56) References Cited

U.S. PATENT DOCUMENTS

| 5,278,901 | A |   | 1/1994  | Shieh et al. |
| 5,414,833 | A |   | 5/1995  | Hershey et al. |
| 5,452,442 | A | * | 9/1995  | Kephart ....................... 714/38 |
| 5,557,742 | A |   | 9/1996  | Smaha et al. |
| 5,623,600 | A |   | 4/1997  | Ji et al. |
| 5,720,033 | A |   | 2/1998  | Deo |
| 5,727,146 | A |   | 3/1998  | Savoldi et al. |
| 5,826,013 | A |   | 10/1998 | Nachenberg |
| 5,948,104 | A |   | 9/1999  | Gluck et al. |
| 5,983,348 | A |   | 11/1999 | Ji |
| 5,991,881 | A |   | 11/1999 | Conklin et al. |
| 6,035,423 | A |   | 3/2000  | Hodges et al. |
| 6,272,641 | B1 |   | 8/2001  | Ji |
| 6,279,113 | B1 |   | 8/2001  | Vaidya |
| 6,301,668 | B1 |   | 10/2001 | Gleichauf et al. |
| 6,321,338 | B1 |   | 11/2001 | Porras et al. |
| 6,477,651 | B1 |   | 11/2002 | Teal |
| 6,681,331 | B1 |   | 1/2004  | Munson et al. |
| 6,701,440 | B1 | * | 3/2004  | Kim et al. ..................... 726/24 |
| 6,789,202 | B1 |   | 9/2004  | Ko et al. |
| 6,792,546 | B1 |   | 9/2004  | Shanklin et al. |
| 6,816,973 | B1 |   | 11/2004 | Gleichauf et al. |
| 2002/0118380 | A1 | * | 8/2002  | Krueger et al. .............. 358/1.9 |
| 2002/0178381 | A1 | * | 11/2002 | Lee et al. .................... 713/201 |
| 2005/0039042 | A1 | * | 2/2005  | Liang ......................... 713/200 |

(Continued)

OTHER PUBLICATIONS

Valentin Razmov and Daniel Simon, "Practical Automated Filter Generation to Explicitly Enforce Implicit Input Assumption", 2001, Proceedings of 17th Annual Computer Security Applications Conference (ACSAC 2001).*

(Continued)

*Primary Examiner*—Meng-Al T. An
*Assistant Examiner*—Jue Wang
(74) *Attorney, Agent, or Firm*—G. Victor Treyz

(57) ABSTRACT

A universal patching machine is used to provide network-based security for a data network. The universal patching machine may be implemented on a network appliance located at the edge of the data network. From this location, the universal patching machine intercepts data traffic between the internet and the data network. The universal patching machine examines the intercepted data traffic to detect security vulnerabilities. If a vulnerability violation is detected, the universal patching machine modifies the data traffic to remove the violation. Fixing the data traffic in this way ensures that the vulnerability cannot be exploited in an attack against the data network. The universal patching machine is formed from patch processors and a packet controller. The patch processors are formed from network patches. In operation, the patch processors detect vulnerabilities and issue modification commands that direct the packet controller to fix the data traffic.

1 Claim, 14 Drawing Sheets

U.S. PATENT DOCUMENTS

2005/0120243 A1*  6/2005  Palmer et al. .............. 713/201
2005/0198110 A1*  9/2005  Garms et al. ............... 709/202

OTHER PUBLICATIONS

Koral Ilgun et al. "State Transition Analysis: A Rule-Based Intrusion Detection Approach", IEEE Trans. Software Eng. vol. 21, No. 3, Mar. 1995, pp. 181-199.

Teresa F. Lunt "A survey of intrusion detection techniques" Computers & Security, 12 (1993) pp. 404-418 (Elsevier Science Publishers Ltd.).

Teresa F. Lunt et al. "A Real-Time Instrusion-Detection Expert System (IDES)", Final Technical Report, Feb. 28, 1992 (SRI International) pp. 1-156.

Herve Debar et al. "Towards a Taxonomy of Intrustion-Detection Systems" (Elsevier Preprint), Oct. 28, 1998 pp. 1-31.

Shiuh-Pying Shieh et al. "On a Pattern-Oriented Model for Intrusion Detection" IEEE Trans. Knowledge and Data Eng. vol. 9, No. 4 (1997) pp. 661-667.

Helen J. Wang et al. "Shield: Vulnerability-Driven Network Filters for Preventing Known Vulnerability Exploits" SIGCOMM '04, Aug./Sep. 2004.

"Computer Security Threat Monitoring and Surveillance" James P. Anderson Co., Feb. 26, 1980, pp. 1-54.

Kenneth J. Macleod "Patch Management and the Need for Metrics" SANS Institute (c) 2004 pp. 1-20.

* cited by examiner

NETWORK-BASED PATCHING MACHINE

BACKGROUND OF THE INVENTION

This invention relates to computer security, and more particularly, to applying patches to fix security vulnerabilities.

Security vulnerabilities in deployed software are discovered with regularity. Both operating systems and application software are affected. As vulnerabilities are identified by the computer security community, they are often included in a list of common vulnerabilities and exposures (CVE). The CVE list attempts to standardize the names of known vulnerabilities.

Computers in which vulnerabilities are not addressed become exposed to security risks. Often these risks are intolerable, so it becomes necessary to install security patches. Patches (also sometimes called "updates" or "bug fixes") are used to fix the portion of the software that gave rise to the security vulnerability. When appropriate patches are in place, the security risk associated with the vulnerability is reduced or eliminated.

In modern computer system environments, patch management can be exceedingly complex. In a typical business enterprise, there are often hundreds or thousands of networked computers, each with a potentially different software configuration. As a result, it is practically impossible to test new patches exhaustively. System administrators are reluctant to install patches without testing, particularly on critical machines, so in practice many patches are not installed or are not installed in a timely fashion. This leaves many computer systems at risk of attack.

It is therefore an object of the present invention to provide improved techniques for applying security patches to computer systems.

SUMMARY OF THE INVENTION

A universal patching machine is provided that protects data networks from security vulnerabilities. The universal patching machine may be implemented on a network appliance located at the edge of a data network. In this location, the universal patching machine and network appliance can intercept data traffic flowing between a communications network such as the internet and the data network. The universal patching machine modifies the intercepted data traffic so that the vulnerabilities cannot be exploited by an attacker.

The universal patching machine is formed from patch processors and a packet controller. The patch processors work at higher network layers such as network layers 6 and 7, whereas the packet controllers operate at lower network layers such as network layers 3-5.

The patch processors and packet controller work together to efficiently detect vulnerability violations and modify data traffic where needed. Efficient processing is ensured by bypassing the higher-network-layer processing of the patch processors when the vulnerability violation detection and fixing operations of the patch processors are not needed. These bypassing operations may be performed using the packet controller.

The patch processors are formed from network patches that address various different security vulnerabilities. As new vulnerabilities are discovered, the functionality of the universal patching machine is updated. The update process involves identifying the vulnerabilities that require attention and determining which network patches are needed to detect and fix these vulnerabilities. The universal patching machine is updated using these network patches.

Each network patch includes state machine logic and one or more associated vulnerability violation detection and fixing functions. To ensure efficiency, duplication is avoided when combining the state machine logic of the network patches. The universal patching machine may have machine code libraries of helper functions. These helper functions may be used to merge the state machines of network patches into a unified state machine. During the formation of the unified state machine for the patch processors, the overall size of the state machine logic is reduced.

As the capabilities of the universal patching machine are updated by adding or removing network patches for the unified state machine in real time, the flow of data traffic through the universal patching machine is not disrupted. With one arrangement, disruption to the data flow is avoided by handling old data traffic sessions with an old version of the universal patching machine processes and new data traffic sessions with a new version of the universal patching machine processes. With another arrangement, data traffic disruption is avoided by selecting a point in time at which to switch over to the new network patches that does not affect the handling of the data traffic by the universal patching machine.

Further features of the invention, its nature and various advantages will be more apparent from the accompanying drawings and the following detailed description of the preferred embodiments.

DETAILED DESCRIPTION OF THE PREFERRED EMBODIMENTS

The present invention relates to methods and apparatus for enhancing security in a computer system by detecting and fixing security vulnerabilities using patches.

The invention may be used in the context of any suitable computer systems. Environments in which security vulnerabilities are handled by installing software directly on a host computer are said to be "host-based." Environments in which security vulnerabilities are handled by installing software on a network appliance at the edge of a computer network (e.g., on a network appliance that serves as a gateway to a local area network), are said to be "network based." In general, the invention applies to both host-based and network-based environments. For clarity, the discussion of the present invention sometimes focuses on network-based environments.

One way to address security vulnerability violations is by installing patches provided by a software vendor (e.g., the vendor of the operating system and/or application software running on a particular machine or network). When vendor patches are installed on a computer system, the system may be said to be a vendor-patched computer system. An illustrative vendor-patched computer system 200 is shown in FIG. 1A.

Installing vendor patches to patch computer system 200 can be difficult, because of issues associated with testing, etc. In accordance with the present invention, a so-called universal patching machine (UPM) is used to intercept and modify traffic, so that the behavior of an unpatched computer system will be exactly or at least approximately the same as the vendor patched computer system 200 of FIG. 1A.

Figure 1A:
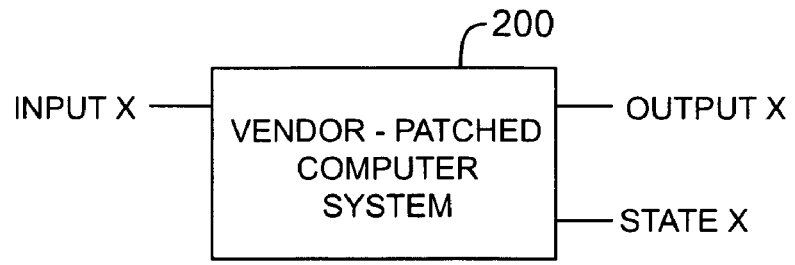
FIG. 1A is a diagram showing the behavior of a patched computer system to an illustrative input.
Figure 1B:
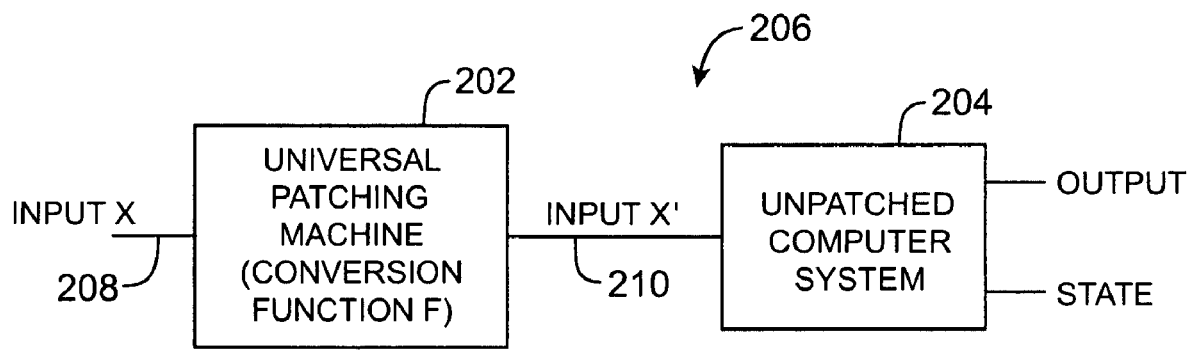
FIG. 1B is a diagram showing how a universal patching machine alters the input applied in FIG. 1A in accordance with the present invention.

A system 206 having a universal patching machine 202 and an unpatched computer system 204 is shown in FIG. 1B. Universal patching machine 202 may be implemented using any suitable hardware. For example, universal patching machine 202 may be installed as part of a host-based security arrangement or may be implemented on a network appliance that is separate from the network 204 that is to be protected.

In the situation of FIG. 1A, an arbitrary input stimuli (inputX) to vendor-patched computer system 200 results in a corresponding output (output X) and a corresponding state (stateX). InputX represents arbitrary data traffic provided to the one or more computers of system 200. OutputX represents the resulting output data produced by the computers of system 200. As an example, inputX may include a series of web page requests for a web server in system 200. OutputX may include the web pages served by system 200 in response. StateX represents the state of computer system 200.

The universal patching machine 202 of FIG. 1B is used to protect an unpatched computer system 204. The universal patching machine 202 implements a conversion function F. The function F modifies data supplied to input 208 to address security issues in unpatched computer system 204. The input data that has been modified by conversion function F is provided by the universal patching machine 202 at output 210.

If the input of FIG. 1A (inputX) is applied to input 208 of machine 202, the conversion functions produces modified data at output 210. The modified data at output 210 is called inputX', because output 210 serves as an input for unpatched computer system 204. When constructing the universal patching machine, a conversion function is selected that attempts to make the universal patching machine 202 and unpatched computer system perform exactly the same as vendor-patched computer system 200. An exact match in performance is not always possible, but a suitable conversion function will generally be able to approximate the performance of the vendor-patched computer system.

During operation of universal patching machine 202, the inputX to machine 202 is converted by the conversion function F into inputX', as shown in FIG. 1B.

In an exact match situation, when inputX' is applied to unpatched computer system 204, the output of system 204 is exactly the same as outputX of FIG. 1A and the state of system 204 is exactly the same as stateX of FIG. 1A.

In an approximate match situation, it is not possible to identify a conversion function that will produce exact matches in output and state. Rather, the conversion function F produces an inputX' that causes: 1. the output of system 204 to approximate outputX and the state of system 204 to exactly match stateX or 2. the output of system 204 to approximate outputX and the state of system 204 to approximate stateX.

Any suitable metric may be used to evaluate how close the output of system 204 is to outputX and how close the state of system 204 is to stateX. As an example, a closeness function may be used to compute a closeness value that is then compared to a closeness threshold value. When a given output or state is close to outputX or stateX (e.g., below the threshold value), that output or state may be said to form an approximate match.

As the example of FIGS. 1A and 1B demonstrates, the universal patching machine (UPM) intercepts data flowing to one or more unpatched computers, and makes the behavior of the combined UPM and unpatched system the same as a patched system.

For most vendor patches, it can be demonstrated that it is possible to find an inputX' and hence a suitable conversion function F that can be applied to the unpatched system so that the output and state of system 204 will be exactly the same as the output of patched system.

There are sometimes vulnerabilities for which it is not possible to find inputX' and a conversion function F that produces exactly same state and output for unpatched system 204 as that of the patched system 200. In these cases, a suitable approximate conversion function F is identified.

Figure 2:
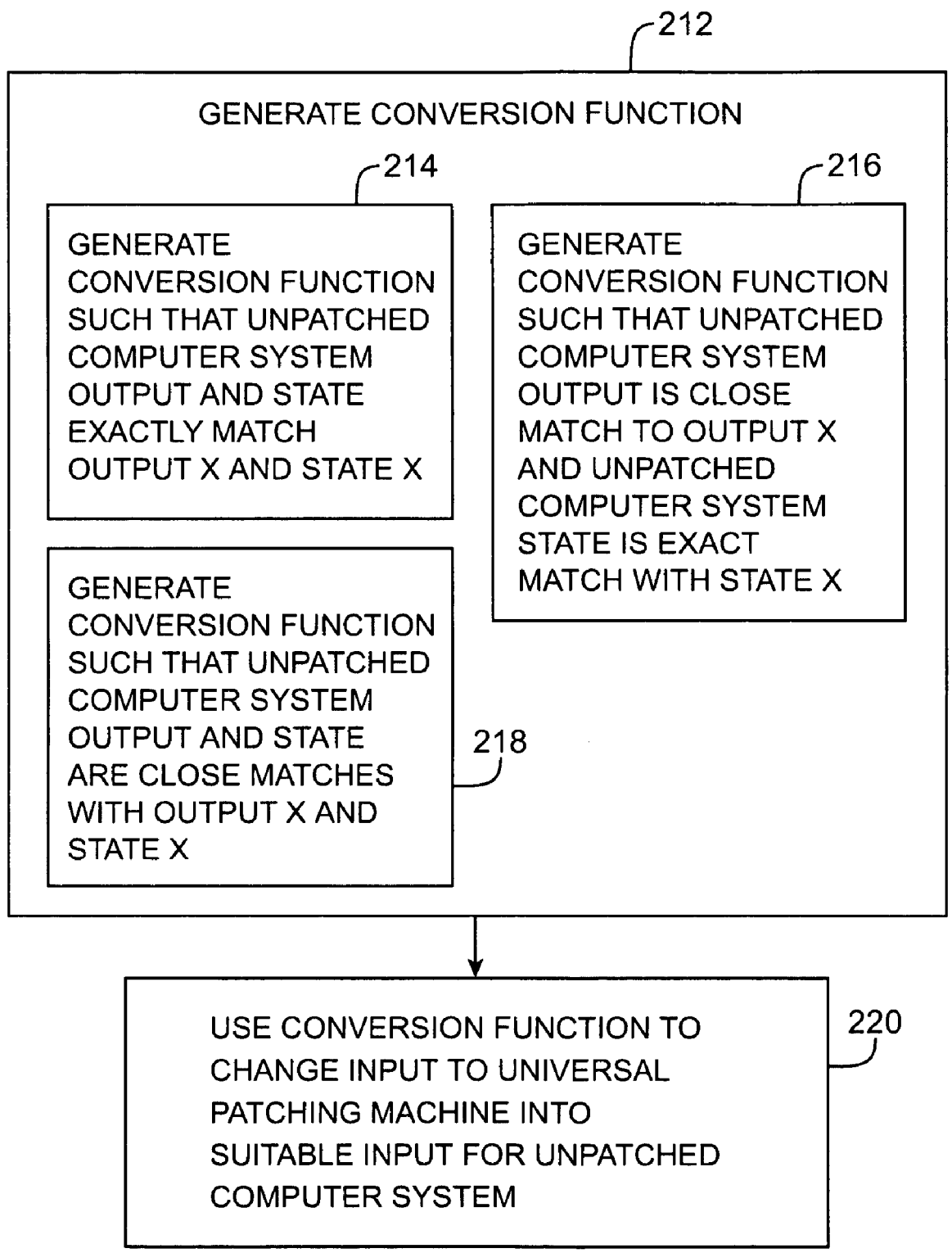
FIG. 2 is a flow chart of illustrative steps involved in using a universal patching machine to provide security for an unpatched computer system in accordance with the present invention.

Illustrative steps involved in generating and using conversion function F to protect an unpatched computer system 204 are shown in FIG. 2.

At step 212, a suitable conversion function F is generated. The generation operations of step 212 may be manual and/or automatic steps performed by a service provider associated with a universal patching machine service.

In an exact match situation, a conversion function F is generated at step 214 such that the output and state of system 204 of FIG. 1B will be an exact match to the output (outputX) and state (stateX) of the vendor-patched system 200 of FIG. 1A.

If it is not possible to generate a conversion function F that will produce an exact match in output and state, at step 216, a conversion function F is generated that produces an approximate match between the output of unpatched system 204 and the patched outputX of system 200 (preferably a match that is as close as feasibly possible). It may or may not be possible in this situation to identify a conversion function F that simultaneously produces an exact match between the state of unpatched system 204 and stateX of system 200. When possible, a conversion function F is generated such that, in response to input X at input 208 of universal patching machine 202, the output of system 204 is an approximation to outputX and the state of system 204 is an exact match with stateX (step 216 of FIG. 2). If step 216 is not possible, a conversion function F is generated such that, in response to input X at input 208 of universal patching machine 202, the output of system 204 is an approximation to outputX and the state of system 204 is an approximation to stateX (step 218 of FIG. 2). Any suitable metric may be used to gauge the effectiveness of the approximations of outputX and stateX that are achieved by the conversion function.

Once a suitable conversion function for the universal patching machine 202 has been generated at step 212, the conversion function is used to change input data supplied to the universal patching machine such that a suitable corresponding input may be provided to the unpatched computer system 204. By intercepting and modifying the input data with universal patching machine 202, the approach of FIG. 1B may be said to involve patching the traffic, rather than patching the system 204.

For vulnerabilities where it is not possible to find an inputX' and hence a conversion function F that will produce exactly the same state and output for the unpatched system 204 as that of a corresponding vendor-patched version of the system, a suitable conversion function can be generated using the following approach:

In a first operation, generate a conversion function such that the resulting state of the unpatched computer 204 is same as the state of patched system 200 when the same input is applied to both systems. If it is not possible (feasible) to identify such a conversion function, a conversion function is identified that will not alter the state of unpatched system 204.

In a second operation, modify the conversion function identified in the first operation such that the impact on the state of unpatched system 204 will be same as described in the first operation, but the distance (difference) between the output data of the unpatched computer and patched computer will be minimized. The distance (as calculated using any suitable metric) between these respective outputs may be computed after removing latency-related differences from the outputs.

These techniques for generating a suitable conversion function F for the universal patching machine 202 are further illustrated by the following examples.

A first example illustrates how a conversion function F may be identified that produces exact matches in output and state for system 204. This first example concerns the ASP-.NET vulnerability. The ASP.Net vulnerability has revealed that an attacker can evade authentication by replacing the forward slash character "/" with a backward slash character "\" in a request directed to an IIS server in a computer system. For this vulnerability, a vendor-supplied patch replaces backward slash characters "\" with "/" characters in each URI (Uniform Resource Identifier) sent to the server. For this vulnerability, the conversion function will also change the "\" characters to "/" character in HTTP URIs directed to the IIS server. This conversion function will change every URI (inputX) such that the state and output of the unpatched system 204 will be same as the state and the output of the patched system 200.

A second example illustrates the generation of a conversion function for the universal patching machine that serves to produce an output for unpatched system 204 that is approximately the same as outputX of vendor-patched system 200. This example concerns the CAN-2003-081 vulnerability. In this vulnerability, a multi-threaded race condition in the Windows RPC DCOM functionality with the MS03-039 patch installed allows remote attackers to cause a denial of service (crash or reboot) by causing two threads to process the same RPC request. This causes one thread to use memory after it has been freed. The vendor patch for this vulnerability fixes the race condition so that the RPC DCOM service does not make the memory corrupted. The universal patching machine conversion function for this vulnerability will rate control (rate limit) the inputs such that two threads are never processing the same RPC request. This conversion function will stop the RPC service from corrupting the memory. The resulting output of the un-patched computer system will have same values as that of a patched computer, but it will be delayed due to the rate limiting introduced by the conversion function. The output of system 204 is therefore a close approximation to outputX.

A third example concerns the CAN-2003-0352 vulnerability This vulnerability is the RPC/DCOM vulnerability that was exploited by the Blaster worm. Only 32 bytes were allocated for a filename field in the RPC API and the API did not check the filename length before copying the data for the associated file. The vendor patch for this vulnerability increases the memory buffer to 256 bytes and checks whether the input field is more than 256. If yes, the patched system will reject the request. If the request has a filename field less than 256 bytes, the request will succeed. If the length is more than 256 bytes, the request will be rejected. As described in connection with step 218, it is not possible (in this example) to find a conversion function that will guarantee that the state of the unpatched computer will be same as the state of vendor-patched computer. A suitable conversion function for this vulnerability will truncate the filename field to 32 bytes. The result of this conversion function will be that the RPC service will reject a request if its length is more than 32 bytes, but will produce no change in state for the RPC service for requests where filename is more 32 bytes. Both the state and output of the system 204 in this third example are therefore approximately (but not exactly) the same as the outputX and stateX of system 200 in response to an identical inputX.

For the universal patching machine 202 to be able to examine all of the inputs destined to an application or operating system, machine 202 should generally be deployed as close as possible to the unpatched system 204. A host-based universal patching machine 202 will have full visibility into all of the inputs, but such a universal patching machine will also exhibit the types of limitations generally seen in host-based intrusion prevention systems such as difficulties associated with product management and deployment.

Network-based UPM (NUPM) solutions have visibility only into network traffic and hence can address only network (or remote) vulnerabilities, but have advantages in terms of ease of management and deployment.

Figure 3:
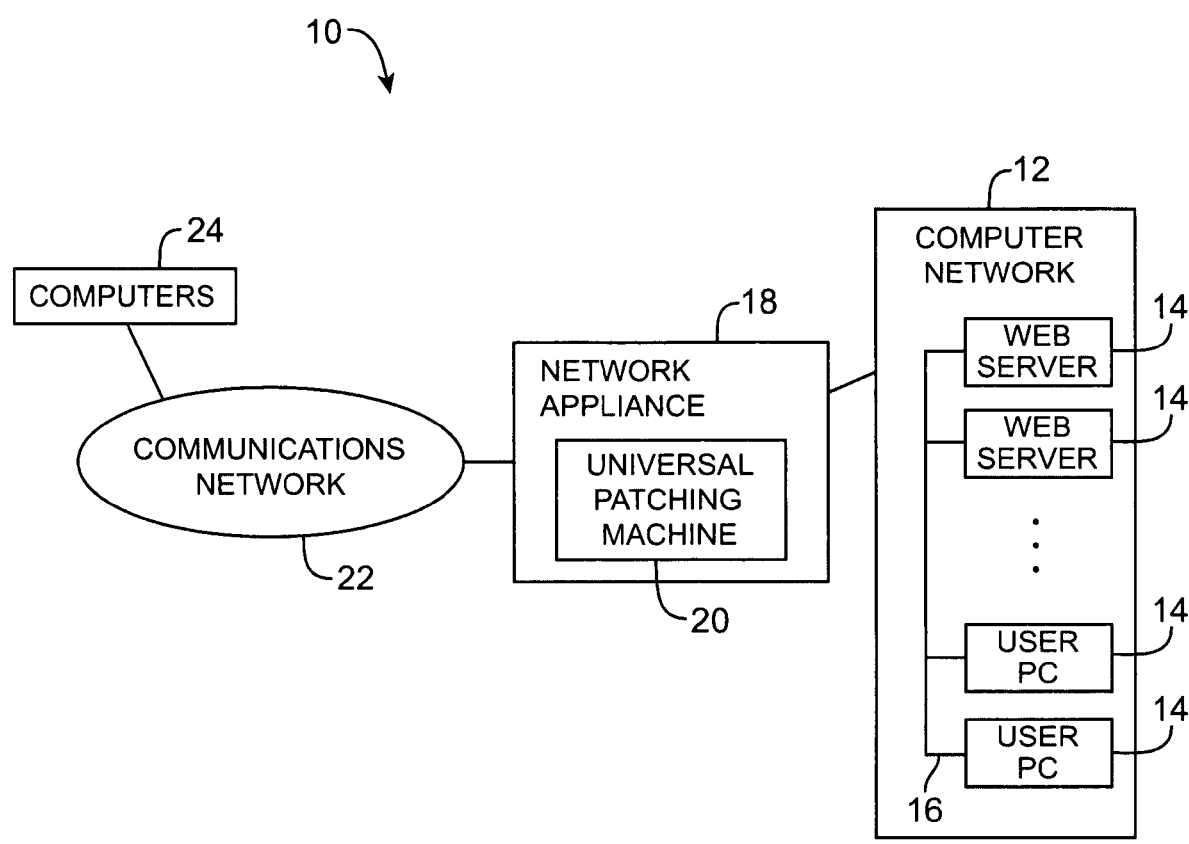
FIG. 3 is a diagram of an illustrative system in which a network appliance is used to implement a universal patching machine for protecting a computer network in accordance with the present invention.

An illustrative network-based UPM system 10 in accordance with the present invention is shown in FIG. 3. In the illustrative arrangement of FIG. 3, a computer network 12 is protected from security vulnerabilities by a network-based universal patching machine 20 implemented on a network appliance 18. In a typical scenario, an entity at a computer outside of network 12 such as one of computers 24 desires to communicate with an entity at a computer 14 inside network 12 over a communications network 22. Network appliance 18 is shown as being separate from network 12 in FIG. 3, but because network appliance 18 may be operated and installed by a system administrator associated with network 12, network appliance 18 is sometimes referred to as being part of network 12 or is referred to as being located at the edge of network 12.

Network appliance 18 may be based on any suitable computer hardware. A typical network appliance 18 has a CPU, memory, hard disk storage, and communications ports. The communications ports may be used to receive and transmit incoming and outgoing data traffic. Communications ports may also be used to support communications between appliance 18 and a backup appliance to provide redundancy in the event of an equipment failure. The processor, memory, and storage in network appliance 18 may be used to run software for implementing the functions of universal patching machine 20. Software may be provided to appliance 18 using any suitable arrangement. For example, some software may be provided to appliance 18 when appliance 18 is installed. Other software 18 may be downloaded from a service provider. As an example, a service provider at a computer 24 may deploy network appliance 18 at the premises of a customer's network 12. Through remote access procedures, the service provider may contact appliance 18 to set up and/or update the functionality of appliance 18 with a current set of network-based patches as needed. If desired, contact may be initiated by the network appliance. To enhance processing throughput, some or all of the functionality of the universal processing machine may be implemented using dedicated hardware. For example, universal processing machine functions may be implemented using custom hardware components such as custom boards, custom field-programmable gate arrays (FPGAs), and application-specific integrated circuits (ASICs). For example, we are planning to implement a packet controller may be implemented using custom hardware.

Computers 14 and 24 may be any suitable computing equipment such as mainframe computers, workstations, portable and desktop computers, handheld computers, etc. Communications network 22 may be any suitable network such as one or more local area networks, the internet, etc. The computers of network 12 may be interconnected by wired and wireless communications paths 16. Typical network communications paths include Ethernet cables, fiber-optic paths, wireless network nodes, etc. Any suitable network topology and network equipment may be used to interconnect the computers 14 in network 12. Moreover, network 12 may be a local area network, a metropolitan area network, a wide area network, or any other suitable network. Generally network 12 will be associated with an organization that desires to protect its assets through proper deployment of security patches.

Network appliance 18 intercepts data traffic sent to and from network 12. The data traffic to and from network 12 may be any suitable communications traffic. For example, the data traffic may be web traffic, email traffic, or any other suitable data traffic.

In a typical scenario, a user at a computer 24 requests a web page from a web server 14 in network 12. In this type of environment, the user's internet browser or other suitable client software generates an http request and transmits this request to an appropriate web server 14 at network 12. In response, the web server 14 at network 12 retrieves the requested page and provides it to the user. The incoming traffic to network 12 includes the http request from the user. The outgoing traffic from network 12 includes the web page material that is provided to the user in response to the request.

Both incoming and outgoing data traffic may be intercepted by the network appliance 18. If the network appliance 18 detects a security vulnerability violation associated with the data traffic, the data traffic may be altered to overcome the vulnerability. In this way, the network appliance 18 may be said to patch or fix the data traffic, rather than directly patching the computers in network 12 by installing vendor patches. This method can be used to provide network patch for all remote vulnerabilities. Because the arrangement of FIG. 3 separates the patching operations of network appliance 18 from the various hardware and software platforms associated with the computing equipment 14, a single network appliance 18 can be used to provide security for multiple computers 14. This greatly reduces the complexity associated with providing security for the computers 14.

Figure 4:
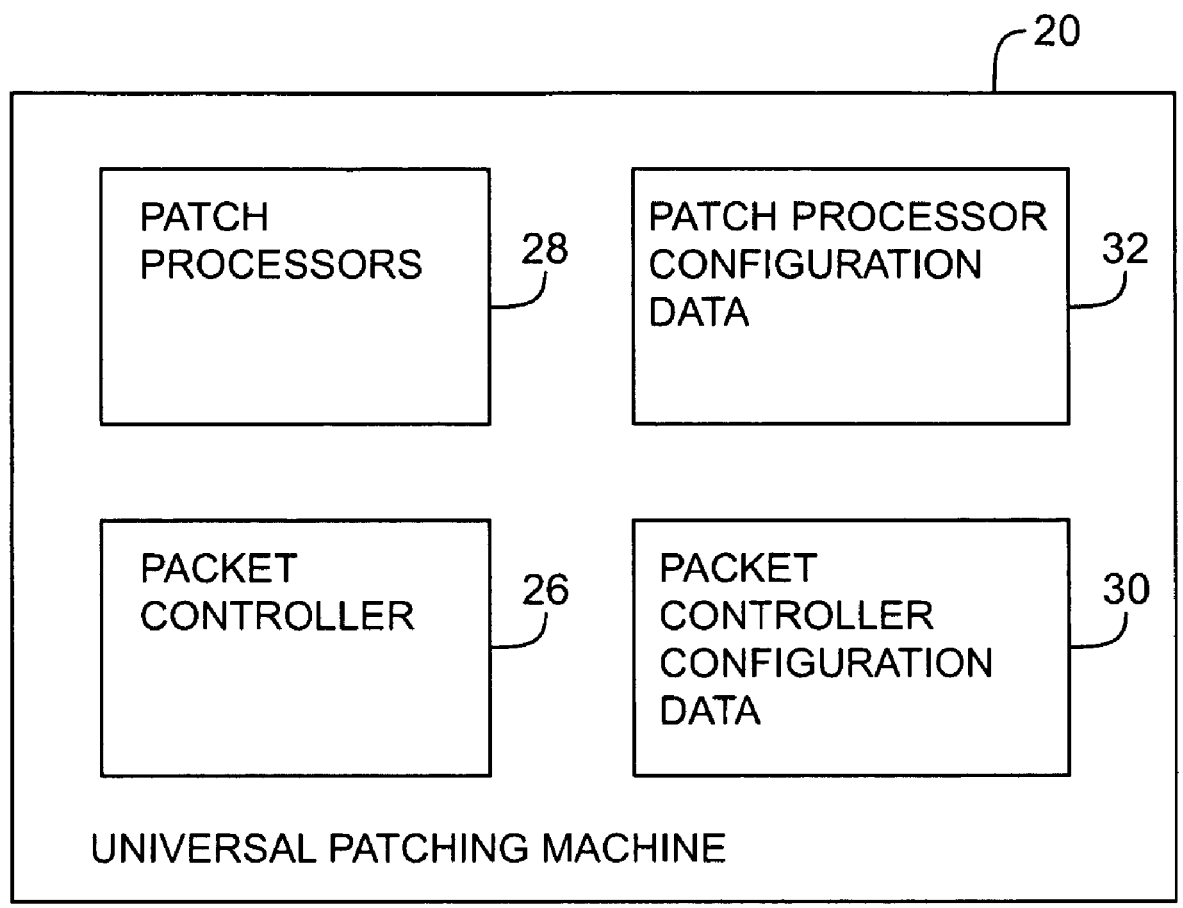
FIG. 4 is a diagram of an illustrative network appliance showing components that may be used to apply security patches in accordance with the present invention.

FIG. 4 shows an illustrative architecture that may be used to implement the network-based universal patching machine 20. The arrangement shown in FIG. 4 is merely illustrative. Any suitable arrangement may be used to provide the functions of universal patching machine 20 if desired.

As shown in the example of FIG. 4, the universal patching machine 20 may have a packet controller 26 and patch processors 28. Packet controller 26 examines data packets in the traffic flowing through patching machine 20. Packet controller 26 outputs all packets from universal patching machine 20 that are believed to be free of vulnerability issues. Packet controller 26 redirects packets that are associated with possible vulnerability violations to patch processors 28. Patch processors 28 work with packet controller 26 to detect and fix vulnerability violations.

Packet controller configuration data 30 and patch processor configuration data 32 may be used to support the operations of packet controller 26 and patch processors 28. Configuration data 30 and 32 may include settings and executable code.

Patching machine 20 intercepts inbound and outbound traffic associated with network 12 (FIG. 3). As data passes through patching machine 20, patching machine 20 detects and fixes security vulnerabilities. If, for example, patching machine 20 determines that incoming data for a web server 14 in network 12 includes an http request and if there is a security vulnerability related to http requests, the patching machine 20 can extract the request from the data being sent to the web server and can alter the request so as to overcome the vulnerability. By patching the traffic in this way, it is not necessary to block potentially legitimate http requests.

Network communications functions are often described in the context of a layered network model. For example, networking protocols are often described with reference to the International Standard Organization's Open System Interconnect (ISO/OSI) network layer model. This model has seven network layers: physical (layer 1), data link (layer 2), network (layer 3), transport (layer 4), session (layer 5), presentation (layer 6), and application (layer 7). The physical layer relates to the physical structure of network connections. The data link layer provides context to the signals at the physical layer. In the data link layer, bits are assigned physical addresses and are formatted into frames. Functions such as error checking may be implemented at the data link layer. At the network layer, data is packaged into datagrams. The network layer also handles the routing of datagrams from one network to another. The transport layer handles operations involved in setting up connections between machines. The transport layer supports flow control and multiplexing functions. The session layer manages communications sessions using handshaking and other mechanisms. The presentation layer handles operations such as data encryption and compression. The application layer provides services for users.

To optimize the efficiency of the data processing tasks performed by the universal patching machine 20, it is generally preferred to perform as much processing as possible at lower layers in the network stack. This type of processing architecture is more efficient than an architecture in which data is processed only at high levels in the network layer stack.

In general, packet controller 26 handles the lower network layers (e.g., layers 2-5). Patch processors 28 process traffic at higher layers (e.g., layers 5-7). The packet controller 26 and patch processors 28 work together by issuing commands. In a typical scenario, the patch processors detect a vulnerability that needs to be addressed. The patch processors then issue a modification command to the packet controller that directs the packet controller to perform an appropriate data modification operation. The modification command may, for example, direct the packet controller 26 to change, remove, or add a data packet. The modified data is not susceptible to the vulnerability and may therefore be considered to be "fixed" or "patched." After the data traffic has been fixed by the patch processors 28 and packet controller 26, it may be forwarded to its intended destination.

Packet controller 26 preferably receives and sends data in compliance with all layer 2-4 communications protocols. As an example, packet controller 26 may support Ethernet at layer 2, Internet Protocol (IP) at layer 3, and Transport Control Protocol (TCP) at layer 4.

Patches processors 28, which handle traffic at layers 5-7, use network patches to implement vulnerability detection and fixing functions. The network patches are used to form a unified state machine that implements procedures for universal patching machine 20.

Network patches may be added and removed as desired to modify the unified state machine. For example, a new patch may be distributed to network appliance 18 from a service provider over communications network 22 or a service provider may send commands to network appliance 18 that direct the network appliance 18 to remove an old patch from active use.

These changes may be performed in real time without disrupting the data traffic. A system administrator, service provider, or other suitable entity may update the patches for the universal patching machine 20 on network appliance 18 without rebooting or otherwise halting the operation of the appliance 18. Data traffic flows continuously through appliance 18, even as new patches are added and old patches are removed.

Patches are added by modifying the patch processor capabilities of universal patching machine 20, without changing the operating system or application programs on the computers 14 in network 12. It is therefore not necessary to attempt to test the operation of new patches for all potential configurations of computers 14. The arrangement of FIG. 3 therefore avoids the testing and downtime problems associated with conventional patching procedures.

Patch processor configuration data 32 contains software and data for supporting the operation of patch processors 28. Patch processor configuration data 32 may, for example, contain machine code libraries (e.g., DLL's) for the network patches used by patch processors 28. The machine code from these libraries can be assembled to form the unified state machine for the patch processors 28. Patch processor configuration data 32 may include system parameters that a service provider may adjust remotely over network 22. System parameter adjustments may be used to optimize the performance of the universal patching machine 20. Illustrative system parameters include system parameters for controlling memory usage in network appliance 18, parameters for setting the permitted number of concurrent processing threads supported by network appliance 18, etc.

Packet controller configuration data 30 includes data that informs the packet controller 26 how to implement access policies. The access policies may specify whether the packet controller 26 should output data from network appliance 18 without processing or should send data to patch processors 28. The access policies may use any suitable criteria. As an example, access policy determinations of whether to forward data to an output or to process data for vulnerabilities may be made based on IP address and port number information.

Packet controller configuration data 30 also preferably includes data that informs the packet controller whether or not the packet controller should forward data through network appliance 18 or should divert data to patch processor 28 based on whether the traffic is client traffic or server traffic.

If desired, packet controller configuration data 30 may include block-size-to-skip data that indicates the size of blocks of data that the packet controller 26 should output from the network appliance without inspection. This setting may be adjusted in real time by the patch processors 28. As an example, if the patch processors 28 detect that the data traffic being handled by the network appliance 18 contains an email message with a large attachment and if the network appliance 18 determines that the attachment is not associated with any potential vulnerabilities, the patch processors 28 can adjust the block-size-to-skip data in the packet controller configuration data 30 appropriately. This adjustment will then direct the packet controller 26 to forward the email attachment through network appliance 18 without inspecting its contents. Throughput efficiency is enhanced by directing packet controller 26 to pass data that does not correspond to a security vulnerability through network appliance 18 without patch processing.

Figure 5:
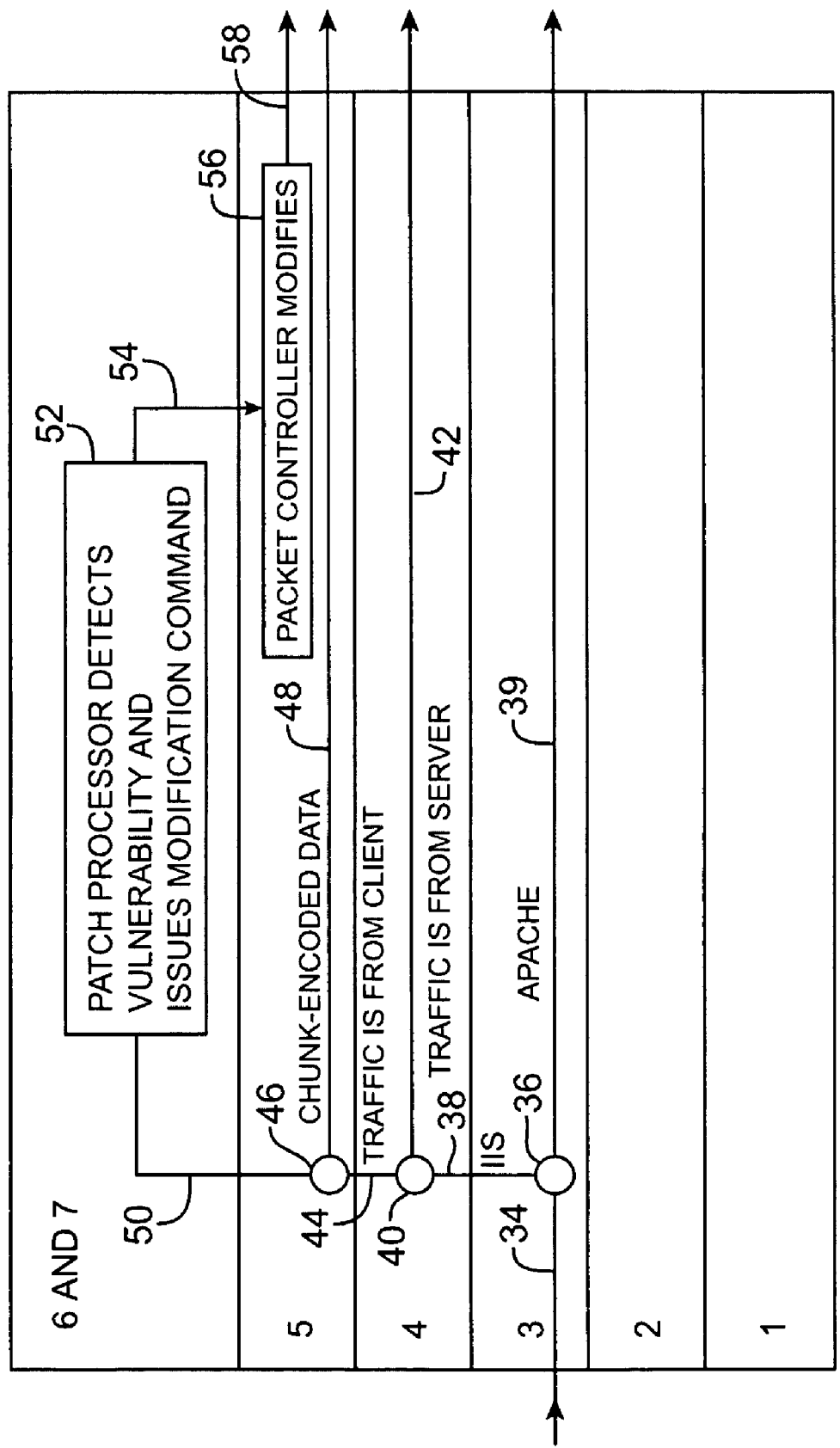
FIG. 5 is a diagram showing how a universal patching machine may handle an illustrative vulnerability related to authentication evasion in accordance with the present invention.
Figure 6:
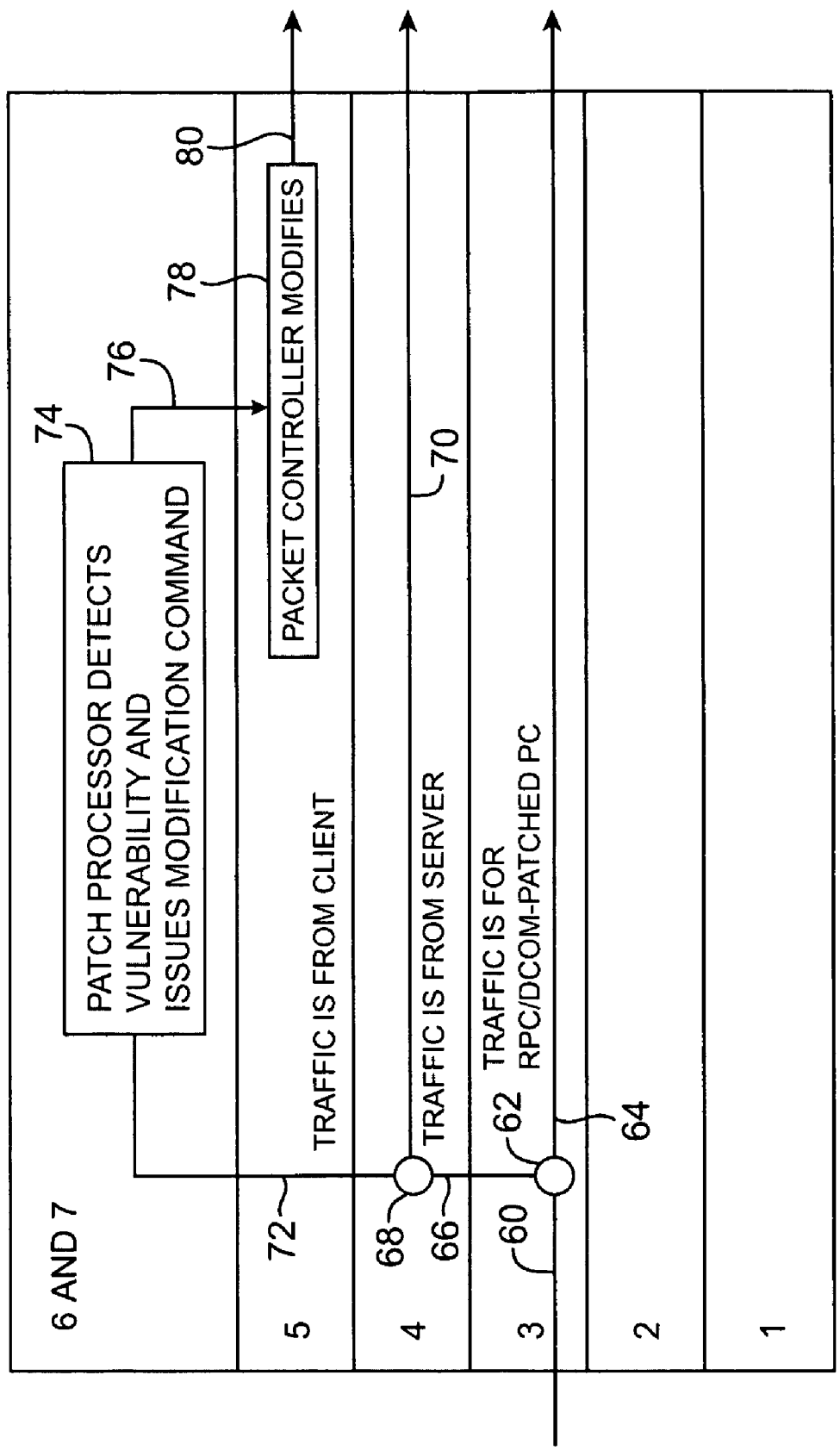
FIG. 6 is a diagram showing how a universal patching machine may handle an illustrative buffer overflow vulnerability in accordance with the present invention.

The operation of universal patching machine 20 in handling two illustrative vulnerabilities is shown in FIGS. 5 and 6. FIG. 5 shows how the universal patching machine 20 processes an authentication evasion vulnerability called the ASP.Net vulnerability. FIG. 6 shows how the universal patching machine 20 processes a buffer overflow vulnerability called the CAN-2003-0352 vulnerability.

Network appliance 18 and universal patching machine 20 preferably handle two-way data traffic.

In handling data traffic that is outbound from network 12, network appliance 18 and universal patching machine 20 receive the outbound data traffic at an input to the network appliance 18 that is connected to network 12. The data is either forwarded in unmodified form to an output of network appliance 18 that is connected to communications network 22 (FIG. 3) or is provided to this output after processing by patch processors 28 (FIG. 4) to remove vulnerability violations.

In handling data traffic that is inbound to network 12, the network appliance 18 and universal patching machine 20 receive the inbound data traffic at an input to network appliance 18 that is connected to network 22. The data from the input is either forwarded in unmodified form to an output of network appliance 18 that is connected to network 12 or is provided to this output after processing by patch processors 28 (FIG. 4).

In FIGS. 5 and 6, data that is being received at the input of the network appliance 18 and universal patching machine 20 is shown as entering the diagram from the left. Data that is being provided to the output of the network appliance and universal patching machine 20 is shown as exiting the diagram to the right. In the diagrams of FIGS. 5 and 6, data flow lines are superimposed on a representation of the seven network layers (1-7) of the ISO/OSI network layer model.

The example of FIG. 5 relates to a vulnerability in which an attacker can send specially crafted requests to a server to view secured content without providing proper credentials. Analysis of this vulnerability (the ASP.Net vulnerability) has revealed that the attacker can evade authentication by replacing the forward slash character "/" with a backward slash character "\" in the server request. The universal patching machine 20 handles this vulnerability by replacing occurrences of any backslash character or its Unicode equivalent with a forward slash character.

During processing, the universal patching machine 20 receives data traffic flowing between network 22 and network 12. Packet controller 26 examines the data traffic at layer 3, as shown by line 34 and test point 36. In the illustrative example of FIG. 5, it is assumed that network 12 of FIG. 3 contains an Apache web server 14 and a IIS web server 14 without vendor patches. It is also assumed that Apache traffic is free of vulnerabilities (in this example). The ASP.Net vulnerability only applies to IIS web server traffic.

At test point 36, the packet controller 26 determines whether the traffic is Apache traffic or is associated with the IIS server. In making this determination, the packet controller 26 uses the access policy information (e.g., an access policy list) in packet controller configuration data 30 (FIG. 4).

In particular, the packet controller 26 examines the headers of the packets in the data traffic to determine their associated IP address and port number. Based on the IP address and port information, the packet controller 26 determines whether the traffic is associated with the Apache server in network 12 or the IIS server in network 12. If the traffic is Apache traffic, it can be concluded (in this example) that there are no vulnerabilities associated with the traffic. The traffic may therefore be forwarded directly to the output of the network appliance 18 without modification, as shown by line 39. This allows higher-layer processing of this data traffic to be avoided, which increases processing efficiency significantly.

If, at test point 36, the packet controller 26 determines that the traffic is for the IIS server, the packet controller 26 can continue to analyze the data traffic at network layer 4 (line 38) by performing additional testing at test point 40. In particular, at test point 40, the packet controller 26 can determine whether the traffic that has been received at the network appliance input is server traffic originating at the IIS server 14 in network 12 or is client traffic originating at one of computers 24. For the ASP.Net vulnerability, the vulnerability is related to the server requests made by the client to the IIS server, so traffic from the server can be forwarded directly to the output of the network appliance and patching machine, as shown by line 42.

If the packet controller 26 determines at test point 40 that the traffic is from the client, the packet controller 26 can pass the data traffic to the patch processors 28 (FIG. 4) for analysis at network layer 5, as indicated by line 44.

As indicated schematically by test point 46 of FIG. 5, the data traffic that is passed to the patch processors 28 for processing at layer 5 is analyzed by the patch processors to determine whether or not it should be forwarded to the patching machine output at layer 5 without further processing. In this example, it is appropriate to forward the data traffic to the patching machine output if it corresponds to chunk-encoded data, as indicated by line 48. If the data traffic is not chunk-encoded data, the patch processors 28 perform further analysis at layers 6 and 7, as indicated by line 50 and box 52.

The forwarding of chunk-encoded data in FIG. 5 is merely an illustrative example. In general, blocks of data traffic may be forwarded to the patching machine output at layer 5 without further processing at network layers 6 and 7 by the patch processors 28 whenever it is determined that data traffic can be excluded from layer 6 and 7 processing because that data does not contain vulnerability violations. For example, the patch processors 28 may identify which blocks of data are to be forwarded without layer 6 and 7 processing using the results of a previous data analysis or by performing real-time data traffic analysis on header information or other data stream contents. The patch processors 28 can specify which blocks to forward using any suitable technique. As an example, the patch processors can specify a block by its start location and block size (e.g., the next N bytes of data starting at a particular location are to be forwarded without layer 6 or 7 processing). As another example, the patch processors can specify a block by its block ending pattern—data traffic in the block is forwarded without layer 6 or 7 processing until the patch processors locate the specified ending pattern in the data traffic. These techniques allow potentially large blocks of data to be forwarded without layer 6 or 7 processing, which enhances efficiency.

In the example of FIG. 5, the patch processors 28 analyze the data traffic during layer 6 and 7 processing operations to attempt to detect violations of the ASP.Net vulnerability. In particular, processors 28 attempt to locate a backslash in a server request for the IIS server 14 in network 12. If a violation of the ASP.Net vulnerability is detected (i.e., if a backslash is located in the request data), the patch processors issue a corresponding modification command for the packet controller 26. As indicated by line 54, box 56, and line 58, the packet controller 26 receives the modification command from the patch processors 28, performs the requested modification operation on the data traffic at layer 5 to remove the vulnerability violation and thereby fix the traffic, and provides the corresponding modified (fixed) traffic to the patching machine output. In this example, the modification request specifies that the packet controller should replace the backslash in the IIS server request with a forward slash. Fixing the data traffic in this way before it reaches network 12 eliminates the security risk associated with the ASP.Net authentication evasion vulnerability, but does not block legitimate server requests, many of which may include backward slashes. The replacement of one character with another in response to a modification command is merely one illustrative example. In general, commands may be used to change one byte of data for another, may be used to delete data, may be used to insert data, etc.

The example of FIG. 6 concerns the CAN-2003-0352 buffer overflow vulnerability. This vulnerability is an RPC/DCOM vulnerability that was exploited by the so-called Blaster worm. RPC/DCOM is a service in the Microsoft Windows Operating System that is used to support remote procedure calls. An attacker who exploits the CAN-2003-0352 vulnerability may be able to run code on a computer without proper authorization. A successful attacker would therefore be able install software or modify data on the attacked computer. Exploitation of the vulnerability requires that the attacker form a DCOM object activation request to the computer that contains a filename field greater than 16 characters in length.

The CAN-2003-0352 vulnerability arose because only 32 bytes were allocated for the filename field in the RPC API and no checks were made regarding the length of the filename field before copying data. It was assumed that a machine name would never be more than 16 characters. However, it is legal to use a DNS-style name that is longer than 16 characters, such as \\server.subdomain.domain.com\share\etc. If a long machine name (S2 name parameter) such as this is used by a user, the universal patching machine 20 fixes the vulnerability violation by truncating the S2 name parameter to make it 32 bytes long. The vulnerability violation is fixed, so a user's sessions will not be dropped without the user knowing the cause of the problem, as would be the case if all uses of long machine names were blocked.

The operations taken by the universal patching machine 20 to detect and fix violations of the CAN-2003-0352 vulnerability are shown in FIG. 6. During operation, the universal patching machine 20 receives inbound data traffic from network 22. Packet controller 26 examines the incoming data traffic at layer 3, as shown by line 60 and test point 62. In the illustrative example of FIG. 6, it is assumed that the CAN-2003-0352 vulnerability is the only vulnerability in existence.

At test point 62, the packet controller 26 determines whether the traffic is destined for a computer 14 in network 12 that has already been patched with a vendor patch to prevent exploitation of the CAN-2003-0352 vulnerability. The packet controller 26 uses information (e.g., an access policy list) in packet controller configuration data 30 (FIG. 4) in making this determination. For example, the packet controller 26 can examine the headers of the packets in the data traffic to determine their associated IP address and port number. The IP address and port information and other information in configuration data 30 indicates to the packet controller 26 whether the traffic is destined for a computer 14 that has been patched. If the traffic is for a RPC/DCOM-patched computer 14, the computer 14 is not susceptible to vulnerabilities, so it is not necessary to process the traffic further in universal patching machine 20 to remove vulnerability violations. Rather, the traffic can be forwarded directly to the output of the network appliance 18 without modification, as shown by line 64. This improves processing efficiency in universal patching machine 20, because higher-layer processing of the data traffic is bypassed. It also avoids double patching.

If, at test point 62, the packet controller 26 determines that the traffic is for a computer 14 that has not been patched to prevent exploitation of the CAN-2003-0352 vulnerability, the packet controller 26 analyzes the data traffic at network layer 4 (line 66) by performing additional testing at test point 68. The CAN-2003-0352 vulnerability affects server-bound traffic from a client such as one of computers 24 (FIG. 3), but does not affect traffic bound for a client computer 14 in network 12. Accordingly, during the processing of test point 68, the packet controller 26 determines whether the traffic that has been received at the network appliance input is traffic from a server or is traffic from a client. Traffic from a server in network 12 is forwarded directly to the output of the network appliance and patching machine, as shown by line 70.

If the packet controller 26 determines at test point 68 that the traffic is from a client computer 24 in network 12, the packet controller 26 can pass the data traffic to the patch processors 28 (FIG. 4) for analysis at network layers 6 and 7, as indicated by line 72.

During layer 6 and 7 processing, the patch processors 28 analyze the data traffic to attempt to detect violations of the CAN-2003-0352 vulnerability. In particular, processors 28 attempt to detect an S2 name parameter in the data with a length greater than 32 bytes. If a name greater than 32 bytes long is detected, the patch processors 28 issue a corresponding modification command for the packet controller 26. The modification command directs the packet controller 26 to truncate the S2 name parameter in the data traffic so that the S2 name parameter is 32 bytes long. The detection of the vulnerability violation and issuance of the modification command for the packet controller 26 is illustrated in FIG. 6 by box 74 and line 76. As indicated by box 78, the packet controller 26 performs the requested data modification (truncation) at layer 5 to remove the vulnerability violation from the data traffic. The fixed data traffic is then provided at the patching machine output, as shown by line 80. Because excess name parameter lengths are removed from the data traffic by the universal patching machine 20, it is not necessary to block all traffic containing excessively long name parameters.

As with the ASP.net example of FIG. 5, the use of universal patching machine 20 to handle the vulnerability violation is superior to solutions based on blocking traffic, because patching machine 20 does not block legitimate traffic. Because traffic is not blocked by universal patching machine 20, attackers attempting to exploit vulnerability violations in network 12 will not know that a security system is in place, but rather will conclude that system 12 has been patched for the vulnerabilities they are trying to exploit. After attempting to exploit a number of different vulnerabilities, they will become frustrated and move to a new target. In this type of situation, attackers will have left a large amount of forensic information behind, so that their activities may be tracked. With traffic blocking systems, in contrast, an attacker immediately becomes aware that an intrusion prevention system is in place and will use evasive techniques to overcome its protections.

The universal patching machine 20 fixes vulnerability violations using network patches (NPs) in patch processors 28. Network patches are conversion functions that are applied to network traffic destined to an unpatched operating system or application in network 12. The network patches modify the traffic so that the response of the unpatched services on the equipment 14 in network 12 behave exactly as if those services had been patched using a conventional vendor patch. Because the network patches operate in patch processors 28 in universal patching machine 20 on equipment 18, it is not necessary to implement any patches for the same vulnerability on the equipment 14 of network 12. The network patches in patch processors 28 therefore provide universal patching without requiring the installation of vendor patches in a potentially vast number of diverse equipment configurations in network 12. The network patches in patch processors 28 also fix vulnerabilities for which no vendor patches are available.

In constructing the universal patching machine 20, the equipment in network 12 that needs the protection provided by network patching is profiled. For each item of equipment 14, information is gathered on which services (operating systems and applications) are to be protected, which port numbers the services are running on, which patches fix remote vulnerabilities but have not yet been applied to the services, and which remote vulnerabilities are not patched. This information is used by the universal patching machine 20.

Figure 7:
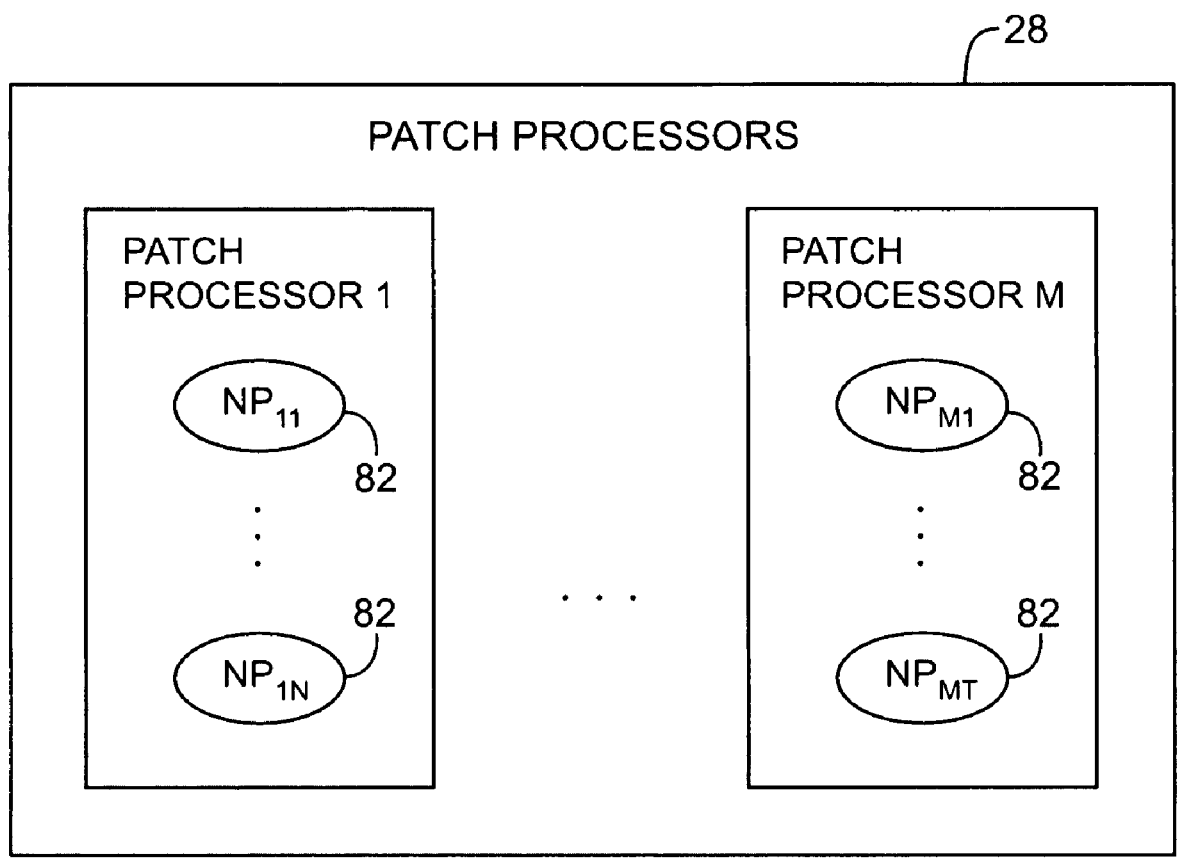
FIG. 7 is a diagram showing how a universal patching machine may have a number of associated patch processors in accordance with the present invention.

As shown in FIG. 7, the patch processors 28 of universal patching machine 20 are each made up of a number of network patches (NPs) 82. There are M patch processors in FIG. 7. The N network patches 82 in patch processor 1 are labeled $NP_{11}$ through $NP_{1N}$. In general, there may be a different number of network patches in each patch processor. The T network patches in patch processor M are labeled $NP_{M1}$ through $NP_{MT}$. A separate patch processor 28 is used for each service to be protected. For example, in a network 12 with an Apache web server, an IIS web server, a personal computer running the Windows XP operating system, and a personal computer running the Windows 2000 operating system, one patch processor 28 is used to protect the Apache application, one patch processor 28 is used to protect the IIS machine, one patch processor 28 is used to protect the Windows XP computer, and one patch processor 28 is used to protect the computer on which Windows 2000 has been installed. In general, one patch processor is used to secure an application or a service with the similar patch level running on multiple machines in the network 12. For example, machines running 1.x version of Apache server will use a different patch processor 28 than machines running the 2.x version of Apache server.

Figure 8:
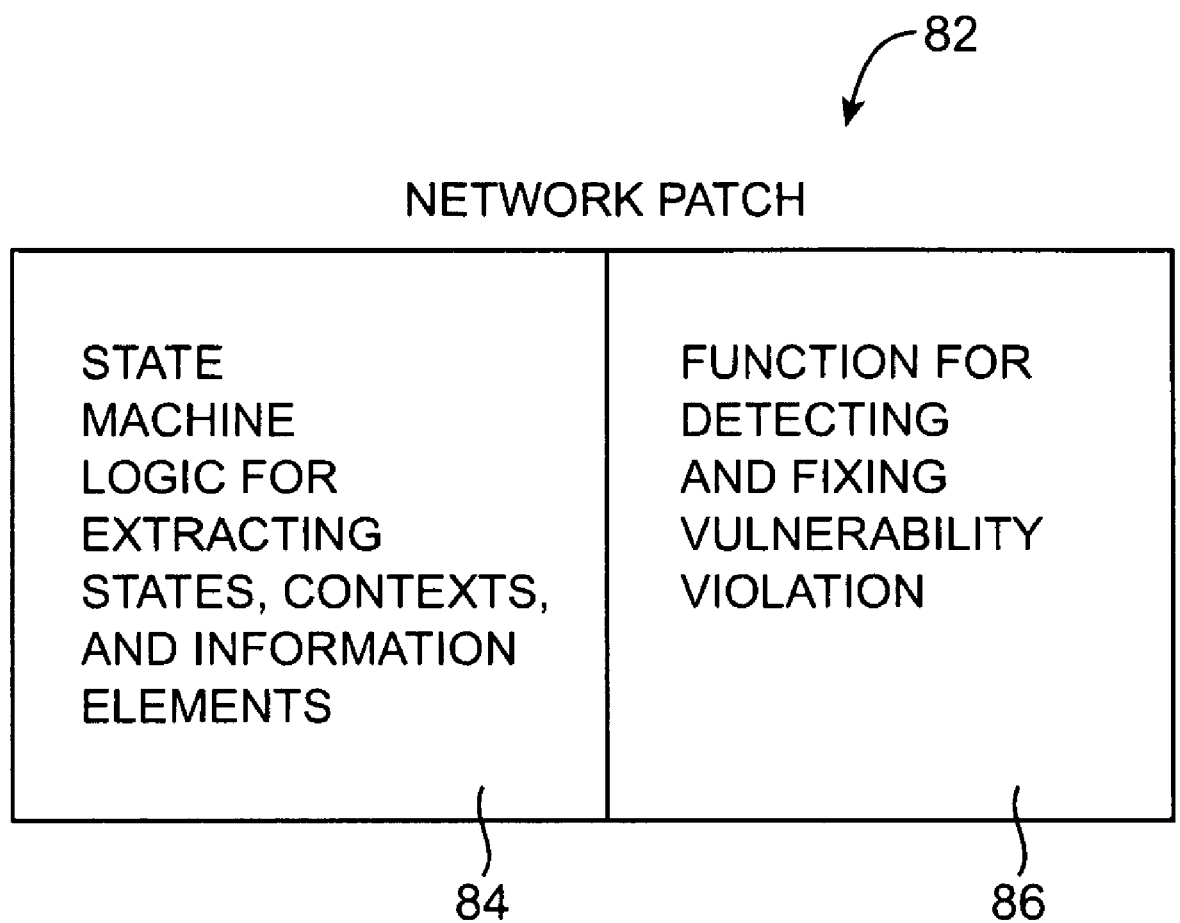
FIG. 8 is a diagram showing how network patches may each have an associated state machine and a function for detecting and fixing a vulnerability violation in accordance with the present invention.

To reduce latency and to lower the processing requirements associated with implementing patch processors 28, the network patches 82 are preferably merged into a unified processing engine. As shown in FIG. 8, each network patch 82 includes a state machine logic portion 84 and a vulnerability detection and fixing function portion 86. Portions 84 and 86 are provided as separate machine code files in patch processor configuration data 32 (FIG. 4). The state machine logic 84 of the network patches implements a state machine that is used to parse the data traffic for processing by functions 86. Functions 86 detect vulnerability violations in the data traffic and fix them.

Figure 9:
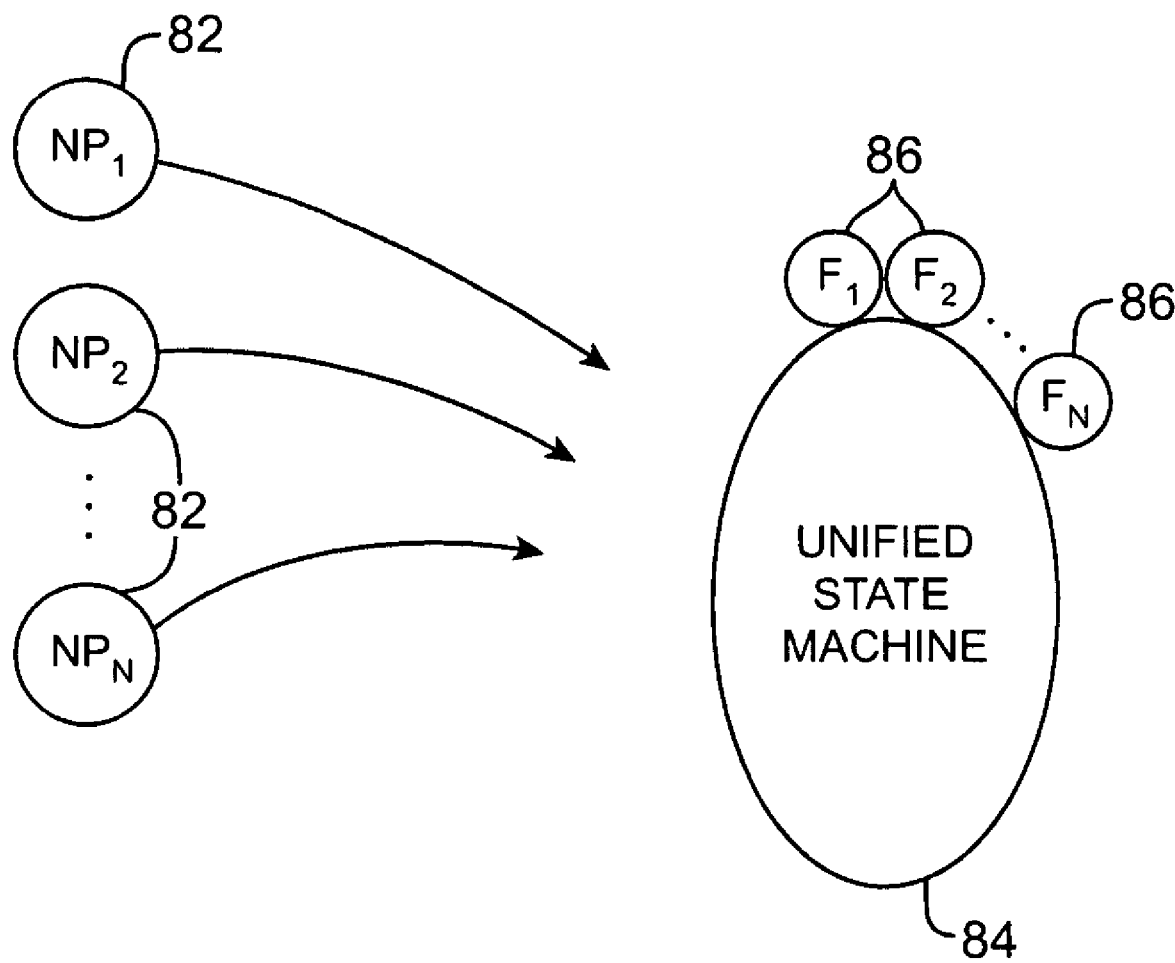
FIG. 9 is a diagram showing how a unified state machine and associated vulnerability processing functions may be constructed from multiple network patches in accordance with the present invention.

In general, there are significant commonalities among the state machines 84 of the network patches 82. In the universal patching machine 20, the state machines 84 of the different network patches 82 are merged to form a unified state machine. The process by which multiple individual network patches 82 are merged into a unified state machine 84 with multiple associated functions 86 is shown in FIG. 9.

An example of an operation that may be shared among processors 28 is an extraction operation used when extracting a parameter from the data traffic. This type of operation is used by many patch processors 28 as they parse the data traffic. It therefore is helpful to share as much of the extraction functionality as possible between patch processors 28. The merging process of FIG. 9 is performed using helper functions (sometimes also called merging functions) that are contained in the patch configuration data 32 whenever a new network patch is loaded for use in unified patch processor 20 or an old network patch is removed.

During the merging process, the state machines 84 of the various network patches 82 are merged to form a single state machine. Duplicate states are avoided and the overall size of the state machine logic is compressed to minimize the total number of states. Significant performance enhancements are obtained through the merging process, because duplication of state machine processing logic is avoided.

The helper functions used to construct the unified state machine logic and functions for the universal patching machine 20 can run without interrupting the operation of the patch processors 28 and packet controller 26 in the universal patching machine 20. This allows network patches to be added for newly discovered vulnerabilities without disrupting the operations of patching machine 20 and network appliance 18. It also allows network patches for vulnerabilities that have been patched using vendor patches to be removed. The addition of new network patches and the removal of old network patches are operations that can both be performed without causing any disruption in the flow of data traffic or the vulnerability detection and fixing operations of universal patching machine 20 when processing the data traffic.

Figure 10:
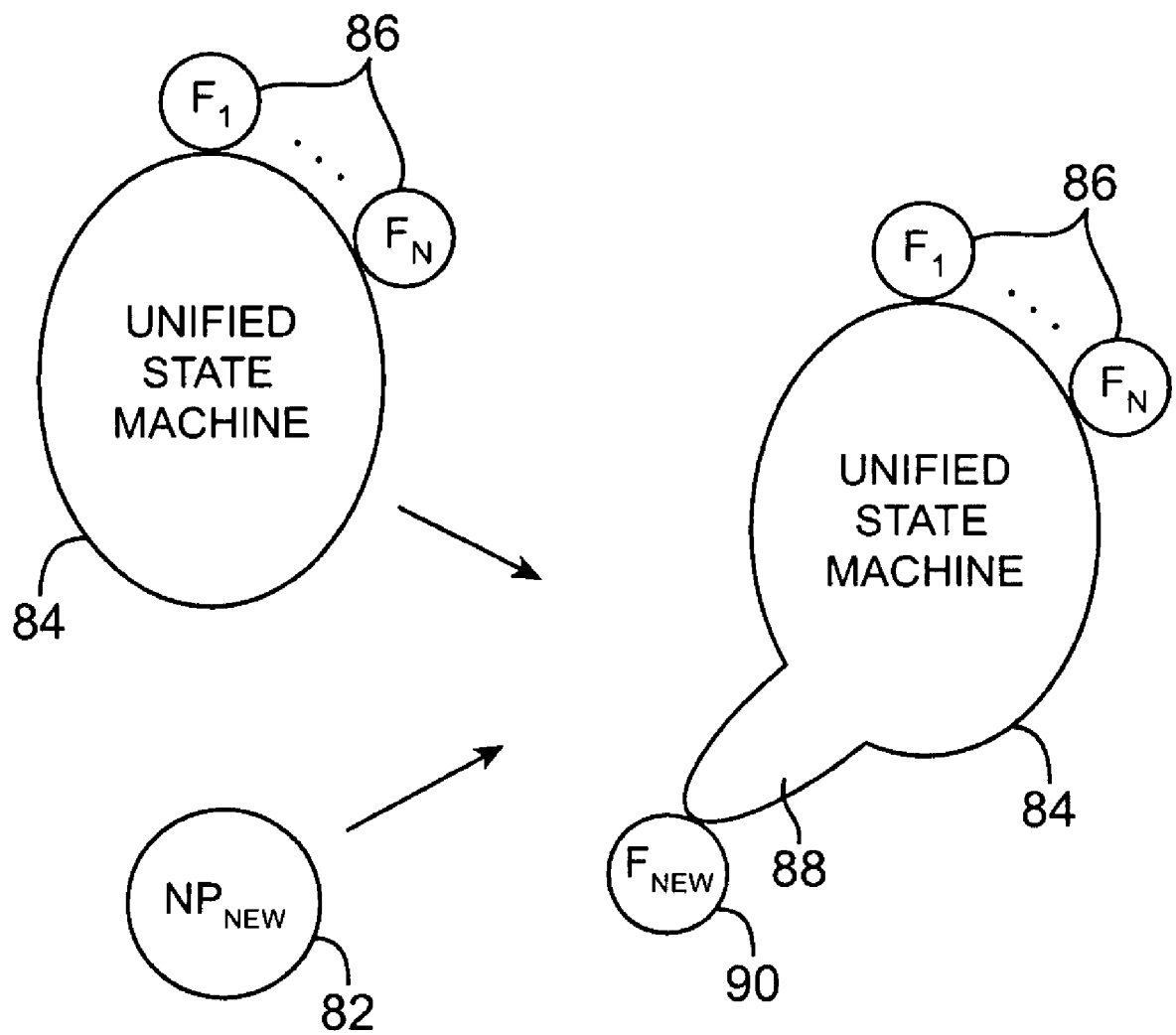
FIG. 10 is a diagram showing how the universal state machine and associated functions are enlarged upon addition of a new network patch in accordance with the present invention.

FIG. 10 illustrates how the unified state machine 84 grows when a new network patch is added. The state machine logic 84 of the merged network patches contains states that are common with the existing state machine of the patch processor. Only the states that are unique to the new network patch 82 are added to the unified state machine. In the example of FIG. 10, new network patch $NP_{NEW}$ contains a new vulnerability detection and fixing function $F_{NEW}$ 88, so the merged network patches shown on the right side of FIG. 10 include both additional state machine logic 88 and a new associated detection and fixing function 90. There is no commonality between the detecting and fixing functions used by the patch processors 28, as each detecting and fixing function detects and fixes a specific vulnerability violation.

Figure 11:
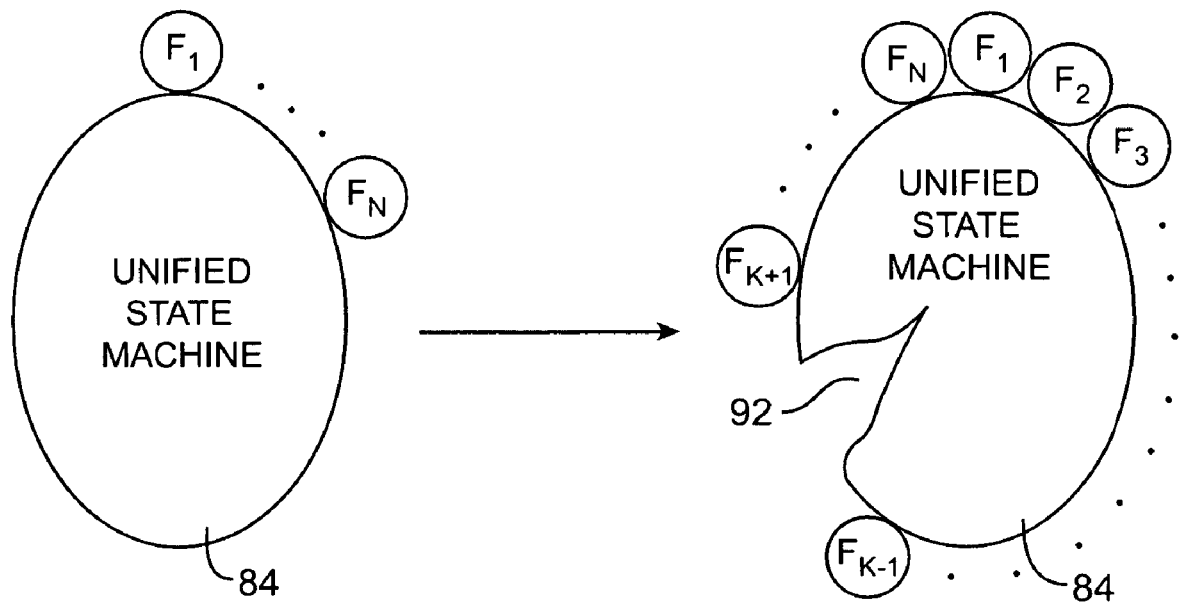
FIG. 11 is a diagram showing how the universal state machine and associated functions are reduced in size upon removal of an old network patch in accordance with the present invention.

FIG. 11 shows how the state machine logic 84 of the patch processors 28 shrinks when a network patch is removed. In the example of FIG. 11, network patch $NP_K$ has been removed from the unified state machine 84, resulting in state machine logic 84 from which state machine logic portion 92 has been removed. The vulnerability detection and fixing function associated with network patch $NP_K$ is function $F_K$. As shown on the right side of FIG. 11, when network patch $NP_K$ is removed from the unified state machine 84, function $F_K$ is removed from the patch processors.

The process of removing network patch $NP_K$ from the patch processors that is illustrated in FIG. 11 is performed by the helper functions of patch processor configuration data 32 (FIG. 4) without disrupting the operation of the patch processors 28 or packet controller 26.

Any suitable technique may be used to ensure that the real time processing of data traffic is not affected by the addition or removal of network patches.

With one suitable approach, the helper functions make a copy of the existing state machine logic. The existing state machine logic is used for handling existing sessions in the data traffic. Before the new copy of the state machine logic is placed into use, the changes of FIG. 10 and FIG. 11 are made by the helper functions. Once the new copy of the unified state machine logic has been modified (i.e., so that region 92 and function $F_K$ have been removed from the state machine in the FIG. 11 example or so that region 88 and function $F_{NEW}$ have been added in the FIG. 10 example), the modified version of the new copy of the unified state machine logic is used to handle new communications sessions in the data traffic. Because existing sessions are handled by the unmodified state machine while the new sessions are handled by the modified state machine, no communications traffic is disrupted by the process of modifying the unified state machine.

With another suitable approach, the helper functions that are used to perform the unified state machine modification select a particular point in time at which to make the modification. By selecting a point in time at which the data traffic is not affected by the modification, the modification is made without disrupting the operations of the universal patching machine 20.

Figure 12:
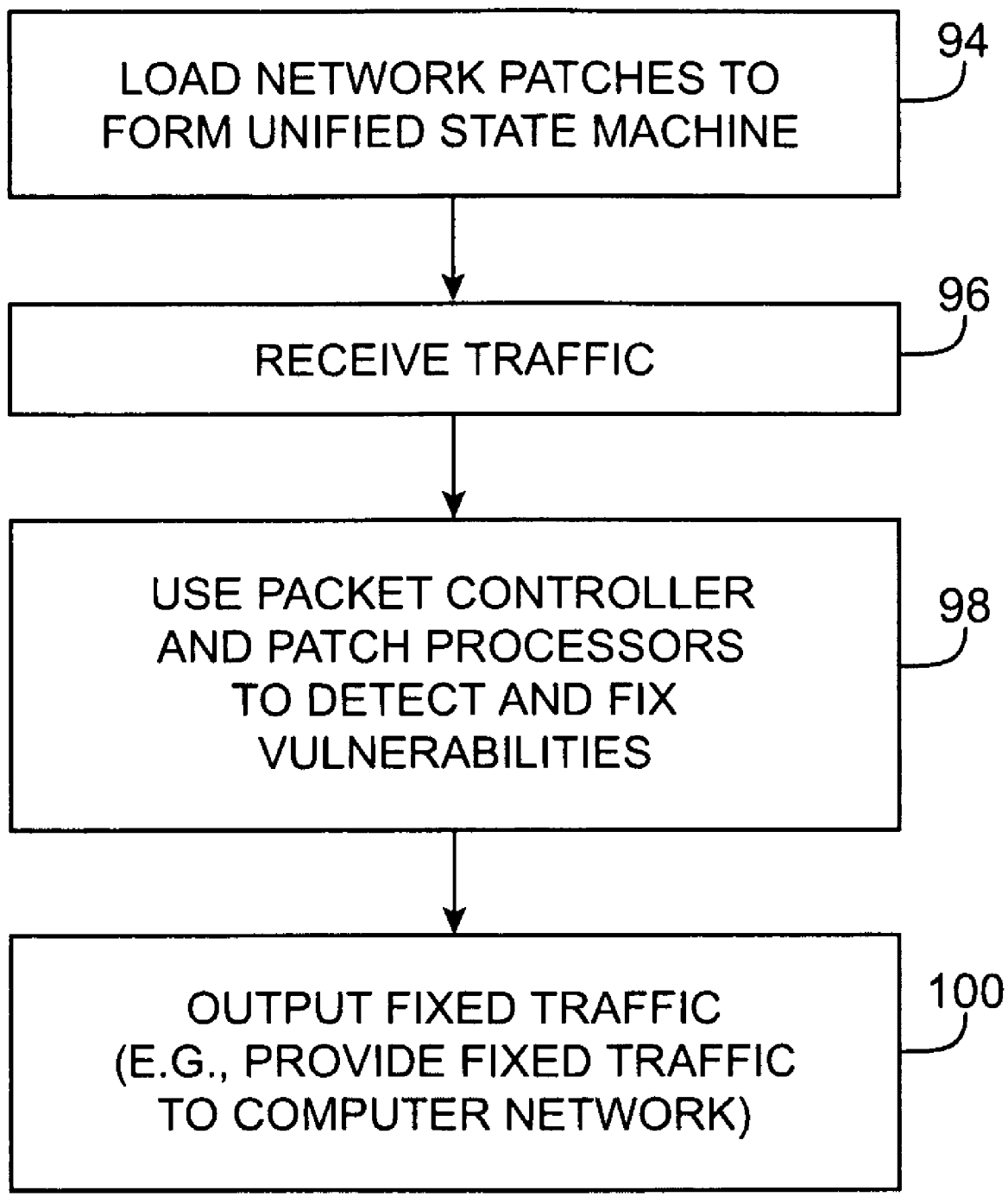
FIG. 12 is a flow chart of illustrative steps involved in using the universal patching machine to enhance security for a computer system in accordance with the present invention.

A flow chart of illustrative steps involved in setting up and using the universal patching machine 20 to detect and fix vulnerability violations is shown in FIG. 12. At step 94, the helper functions of patch processor configuration data 32 (FIG. 4) are used to form the unified state machine 20, as described in connection with FIGS. 7-11.

At step 96, the patch processors 28 and packet controller 26 receive data traffic at an input to network appliance 18. The data traffic that is received may be inbound traffic that is destined to equipment 14 in network 12 or may be outbound traffic from equipment 14.

At step 98, the packet controller 26 and patch processors 28 are used to detect and fix vulnerability violations in the data traffic. During step 98, the state machine logic 84 extracts the states of the layer 6 and 7 protocols associated with the traffic, extracts contexts from the traffic, and extracts necessary "information elements" (e.g., elements such as hostname and filename elements in the context of an http request, etc.).

Following processing, the data traffic is output at step 100. The packet controller 26 and patch processors fix detected vulnerability violations, so that the outgoing traffic from the universal patching machine 20 does not contain vulnerability violations.

Figure 13:
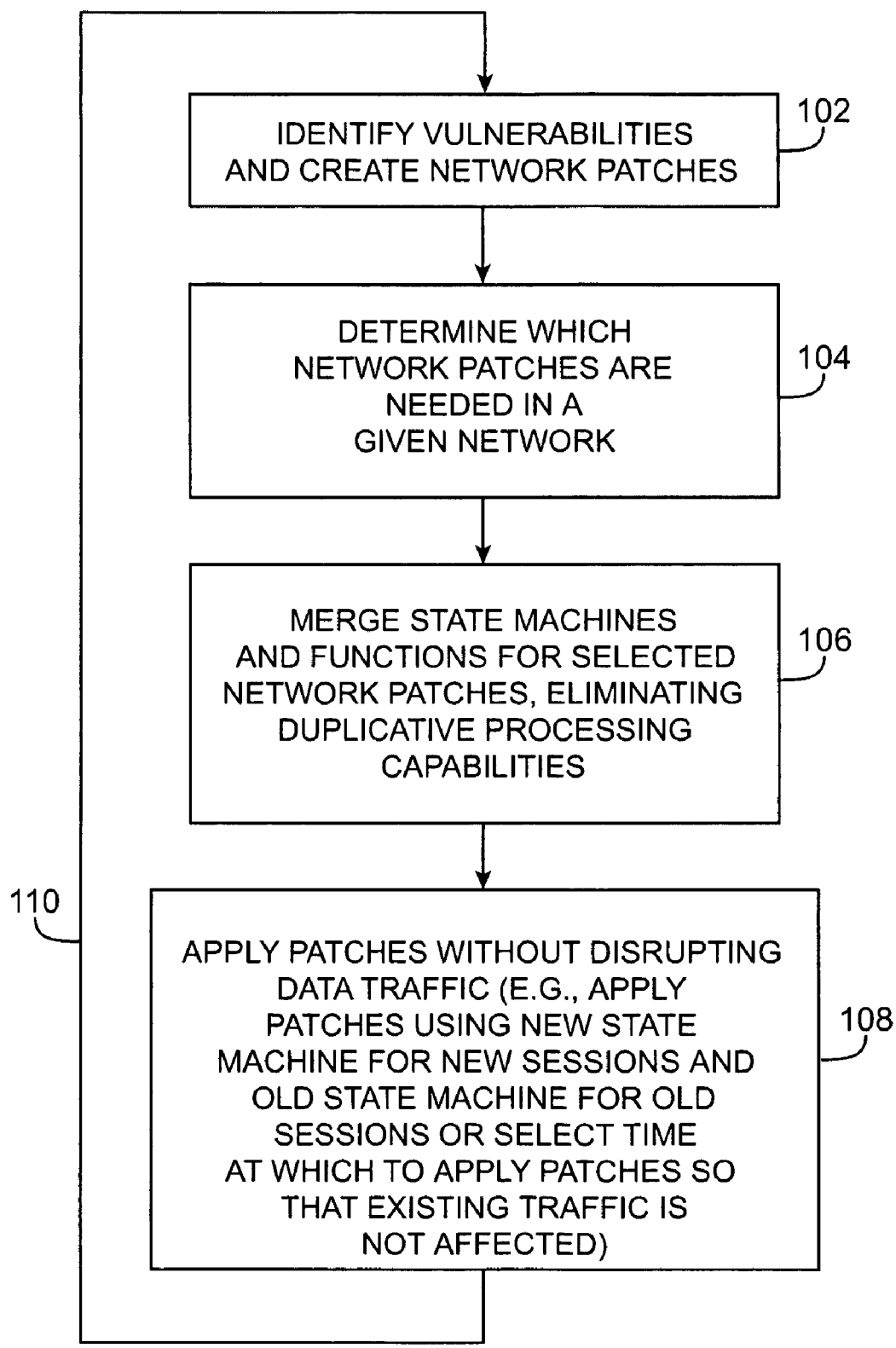
FIG. 13 is a flow chart of illustrative steps involved in maintaining up-to-date network patches for the universal patching machine in accordance with the present invention.

The universal patching machine 20 is implemented using a network appliance 18 that is located between network 22 and the network 12 being protected. When a new network patch is injected into the universal patching machine 20, the services being protected are not disrupted. FIG. 13 shows illustrative steps involved in setting up and maintaining the patch processors 28 in an environment in which network patch requirements for machine 20 evolve as a function of time.

At step 102, vulnerabilities that need to be addressed by the universal patching machine 20 are identified. The vulnerability identification process of step 102 may involve examining publicly available lists of common vulnerabilities and exposures (CVE lists), consulting vendors for lists of vendor-announced patches, determining whether hackers or other third-parties in the software community have publicized vulnerabilities, or using other suitable resources. The process of step 102 may be performed automatically (e.g., using software operated by the service associated with the universal patching machine software), may be performed manually (e.g., using personnel at the service), or may be performed using a combination of manual and automatic procedures. After vulnerabilities have been identified that are to be patched, network patches for the vulnerabilities may be created at step 102. The network patch creation process typically involves at least some manual coding operations that are performed based on an analysis of the vulnerability and appropriate solutions to overcome the vulnerability. The network patches that are created may be stored on a server associated with a network patching service provider and may be distributed to customers at various networks 12 over communications network 22.

At step 104, it is determined which of the network patches are needed to detect and fix the vulnerabilities in a given network 12. In particular, manual and or automatic software-based services may be used to gather network status information for the given network 12. The software-based services used at step 104 may include a discovery application that scans the equipment of the given network 12 to determine which vendor patches have been installed and which network patches have been installed.

The network status information gathered at step 104 may include information on which vulnerabilities need to be addressed. If desired, a system administrator at the network 12 may be provided with an opportunity to manually intervene in the processes of deciding which vulnerabilities need to be addressed. The system administrator may, as an example, decide which network patches to install by clicking on appropriate on-screen options provided by the network patching software. The network patching software used to gather this information may be implemented using network appliance 18 or any other suitable platform.

Using information on which network patches are available, which vendor patches have already been installed (so that corresponding network patches are not needed), and which vulnerabilities the system administrator desires to patch, the patching system software determines which network patches are to be included in patching machine 20 and which are to be removed from patching machine 20 (e.g., because they are duplicative of installed vendor patches or because the system administrator does not desire network patches for particular vulnerabilities).

After the appropriate network patches to be incorporated into the universal patching machine 20 have been identified at step 104, the helper functions of patch processor configuration data 32 may be used to create the universal patching machine 20 (step 106). In particular, the helper functions may merge the state machine logic 84 of the appropriate network patches to form a unified state machine, as described in connection with FIGS. 7-11. During step 106, the state machines 84 and associated functions 86 for the selected network patches are merged while duplicative processing capabilities are eliminated.

At step 108, the selected network patches are applied by the universal patching machine 20 without disrupting the data traffic through network appliance 18. Any suitable technique may be used to ensure that data traffic is not disrupted during the network patch update process. For example, the new set of network patches may be applied by using a new state machine to handle new data traffic sessions while an old version of the state machine is used to handle existing data traffic sessions. As another example, the time at which to apply the new set of network patches may be chosen so that the changeover between the old set of network patches and the new set of network patches does not affect existing traffic.

As indicated by line 110, the process of FIG. 13 may be performed continuously, so that the capabilities of the universal patching machine remain up to date as new vulnerabilities are identified.

Because patching operations are performed by the universal patching machine 20 without changing operating system or application files (e.g., DLLs for Windows) on the equipment 14 of network 12, the use of universal patching machine 20 avoids the problems associated with testing and deploying vendor patches directly on equipment 14. The universal patching machine 20 does not interact with the operating systems and applications running on network 12. The network patches of machine 20 only affect the state machine of the patch processors 28. Because there are a relatively small number of possible state machine configurations, comprehensive testing of the universal patching machine 20 is possible. Comprehensive testing of vendor patches is generally not practical, because the number of different possible combinations of operating systems and applications that exist on the various pieces of equipment 14 in networks such as network 12 is too large.

Figure 14:
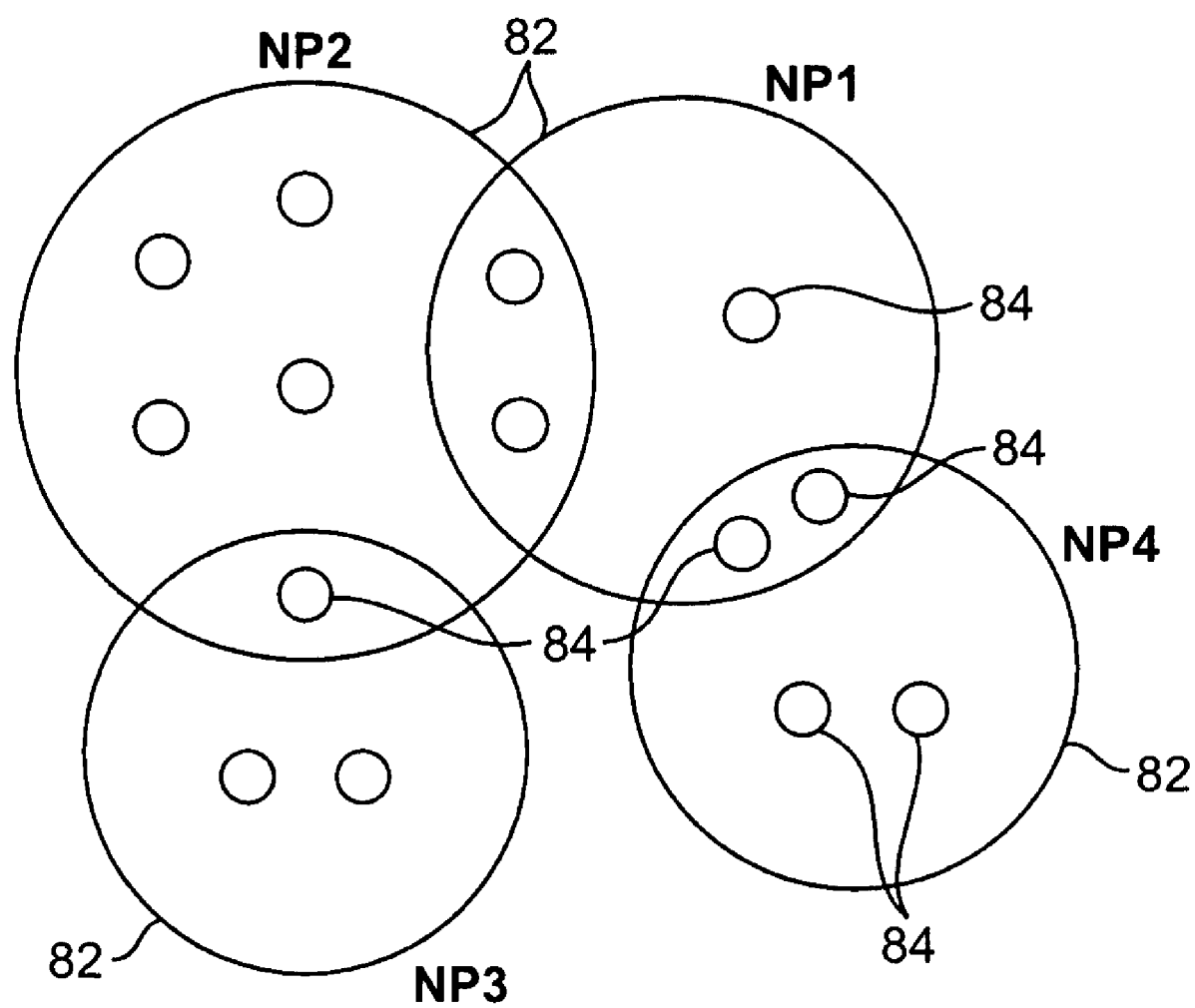
FIG. 14 is a diagram showing how the state machine logic of typical network patches overlaps in accordance with the present invention.

FIG. 14 illustrates how comprehensive testing of the universal patching machine 20 is possible. In the example of FIG. 14, there are four network patches NP1, NP2, NP3, and NP4. Each network patch 82 contains a number of state machines 84. As shown in FIG. 14, there is an overlap between network patches, so that some of the state machines 84 are common to multiple network patches. In the situation of FIG. 14, for example, there are two state machines 84 in common between network patch NP1 and network patch NP4.

Because not all network patches 82 have state machines 84 in common, it is not necessary to test the operation of all possible combinations of network patches. For example, when adding network patch NP3 to a universal state machine made up of network patches NP2, NP1, and NP4, is not necessary to test the operation of all possible combinations of NP1, NP2, NP3, and NP4. Rather, because the NP3 state machines overlap only with the state machines of network patch NP2, it is sufficient to test the operation of network patch NP3 alone and in any combination of network patches including NP2. By restricting the testing of network patch combinations to only those that are necessary as determined by state machine overlap considerations, comprehensive testing of the universal patching machine is possible. In most situations, the number of configurations that need to be tested to provide comprehensive testing is less than ten.

Because the universal patching machine 20 is based on a merged state machine (see FIG. 9), duplicate processing is avoided. The patch processors only execute the state machine logic contained in the merged state machine. Because the state machine logic is compressed (merged), it may achieve results efficiently.

By updating the network patches being used to reflect changes in identified vulnerabilities and installed vendor patches, old network patches can be removed. Extraneous processing associated with these old network patches is therefore eliminated.

Not all packets in the data traffic contain information that is needed to process currently known vulnerabilities. To enhance performance, the packet controller 26 can forward certain packets at low layers in the network protocol stack as described in connection with FIGS. 5 and 6. In a typical deployment, more than 90% of traffic need not be sent to patch processors 28 and can be forwarded to the patching machine output by the packet controller 26 at either the IP layer or TCP layer.

The amount of traffic that is processed depends on the number of network patches that are needed. As the number of patch processors and network patches decreases, the patch configuration data 32 (FIG. 4) reflects the reduced amount of patching to be performed. As a result, the packet controller 26 will forward a relatively larger fraction of traffic to the patching machine output at low network layers without sending it to the patch processors 28 for vulnerability violation detection and fixing operations. This is advantageous because it allows the complexity of the patching machine 20 to be reduced.

Once a vulnerability has been fixed by the universal patching machine 20, computer worms and other attacks that attempt to exploit the vulnerability become ineffective.

The foregoing is merely illustrative of the principles of this invention and various modifications can be made by those skilled in the art without departing from the scope and spirit of the invention.

What is claimed is:

1. A method for protecting a computer system using a universal patching machine rather than protecting a computer system by exclusively applying vendor-provided security patches to the computer system to produce a vendor-patched system, wherein when input data is applied to the vendor-patched computer system, a resulting output and state for the vendor-patched computer system are produced, wherein the input data is data traffic flowing between a communications network and the computer system, wherein the output is the resulting output data traffic produced by the computer system in response to its current state and the input data, and wherein the state is the state of the software in the computer system, the method comprising:

attempting to generate a conversion function for the universal patching machine that modifies input data to the computer system by performing a character replacement so that the computer system has an output and state that exactly match the output and state of the vendor-patched computer system in response to the input data before modification;

if it is not possible to generate the conversion function that modifies the input data so that the output and state of the computer system exactly match the output and state of the vendor-patched computer system, attempting to generate a conversion function that modifies the input data to the computer system by rate limiting the input data so that the computer system has a state that exactly matches the state of the vendor-patched computer in response to the input data before modification and that has an output that approximately matches the output of the vendor-patched computer in response to the input data before modification;

if it is not possible to generate a conversion function that modifies the input data so that the state of the computer system exactly matches the state of the vendor-patched computer system and so that the output of the computer system approximately matches the output of the vendor-patched computer system, generating a conversion function that modifies input data to the computer system so that the computer system has a state and output that approximately match the state and output of the vendor-patched computer in response to the input data before modification; and using the conversion function in the universal patching machine to protect the computer system.

* * * * *